United States Patent
Malone et al.

(10) Patent No.: US 8,838,657 B1
(45) Date of Patent: Sep. 16, 2014

(54) DOCUMENT FINGERPRINTS USING BLOCK ENCODING OF TEXT

(75) Inventors: James A. Malone, Seattle, WA (US); Derick A. Thompson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 186 days.

(21) Appl. No.: 13/607,420

(22) Filed: Sep. 7, 2012

(51) Int. Cl.
 *G06F 17/30* (2006.01)
(52) U.S. Cl.
 USPC ........... 707/821; 707/609; 707/687; 707/953; 707/790
(58) Field of Classification Search
 USPC .......... 707/609, 687, 790, 813, 821, 964, 953
 See application file for complete search history.

(56) References Cited

U.S. PATENT DOCUMENTS

| | | | |
|---|---|---|---|
| 5,953,415 A | 9/1999 | Nielsen | |
| 6,990,233 B2 * | 1/2006 | Park et al. | 382/164 |
| 7,707,157 B1 | 4/2010 | Shen | |
| 7,707,206 B2 | 4/2010 | Encina et al. | |
| 7,730,316 B1 | 6/2010 | Baccash | |
| 7,954,151 B1 | 5/2011 | Nisbet et al. | |
| 8,032,757 B1 | 10/2011 | Zhao et al. | |
| 8,086,039 B2 | 12/2011 | Kletter | |
| 8,116,516 B2 * | 2/2012 | Rhoads | 382/100 |
| 2003/0228031 A1 * | 12/2003 | Rhoads | 382/100 |
| 2005/0060643 A1 | 3/2005 | Glass et al. | |
| 2008/0159588 A1 * | 7/2008 | Rhoads | 382/100 |
| 2010/0254615 A1 | 10/2010 | Kantor et al. | |
| 2012/0093421 A1 | 4/2012 | Kletter | |

* cited by examiner

*Primary Examiner* — Sana Al Hashemi
(74) *Attorney, Agent, or Firm* — Robert C. Kowert; Meyertons, Hood, Kivlin, Kowert & Goetzel, P.C.

(57) ABSTRACT

Methods and apparatus for document encoding using block encoding of text are disclosed. A computing device is configured to detect, within a digitized image object, a plurality of element groups, where each group comprises one or more text image elements and is separated from other groups by at least one delimiter. The device generates a numerical representation of the groups, comprising a plurality of numerical values, where a particular value corresponding to a particular group is determined based at least in part on a combined size of text image elements of the particular group. The device stores at least a subset of the numerical representation as a fingerprint representing text contents of the digitized image object.

30 Claims, 10 Drawing Sheets

DOCUMENT FINGERPRINTS USING BLOCK ENCODING OF TEXT

BACKGROUND

The number of paper and electronic documents that businesses must manage continues to grow. Many large corporations and other organizations maintain document management systems to handle the large volumes of documents they have to process. Such document management systems may, for example, transform documents from some set of formats (e.g., paper documents or books, e-book formats, emails, word processor output files) to others (e.g., searchable Portable Document Format (PDF) files), index the content of documents to facilitate searches, and store documents in various formats in a repository. For input documents that are not already in searchable electronic formats, optical character recognition tools may be invoked to extract the text content in some environments. In some cases, a given document (such as report or a contract) may go through several different versions before it is finalized, and several of the versions of it may be saved in the document management system over time. Regulations and laws may also impose requirements on how long certain types of documents have to be retained, further adding to the sizes and workloads of document repositories.

Traditional document management systems can often be resource-intensive, requiring substantial processing and storage capabilities. Furthermore, because of the large number of documents and the proliferation of different versions and formats in which the documents may have to be stored, the process of finding documents similar to a given document, or searching for specific text within a library of documents, can become expensive, especially if compute-intensive traditional optical character recognition techniques have to be used.

At the same time, during recent years, more and more business functions are being conducted (e.g., due to the quick response times needed for various business tasks, and/or due to the geographically dispersed workforces of many types of organizations) using mobile devices such as smart phones and tablets. Such devices are usually equipped with cameras capable of generating images (e.g., of business documents) of reasonable quality, and screens capable of displaying fairly high-resolution images. Although the imaging and processing capabilities, as well as the memory and storage capacities, of tablets and smart phones have improved rapidly, most such devices are still likely to become unresponsive if compute-intensive document management operations such as traditional character recognition or full-text comparisons are attempted on them for all but the simplest documents.

Figure 1:
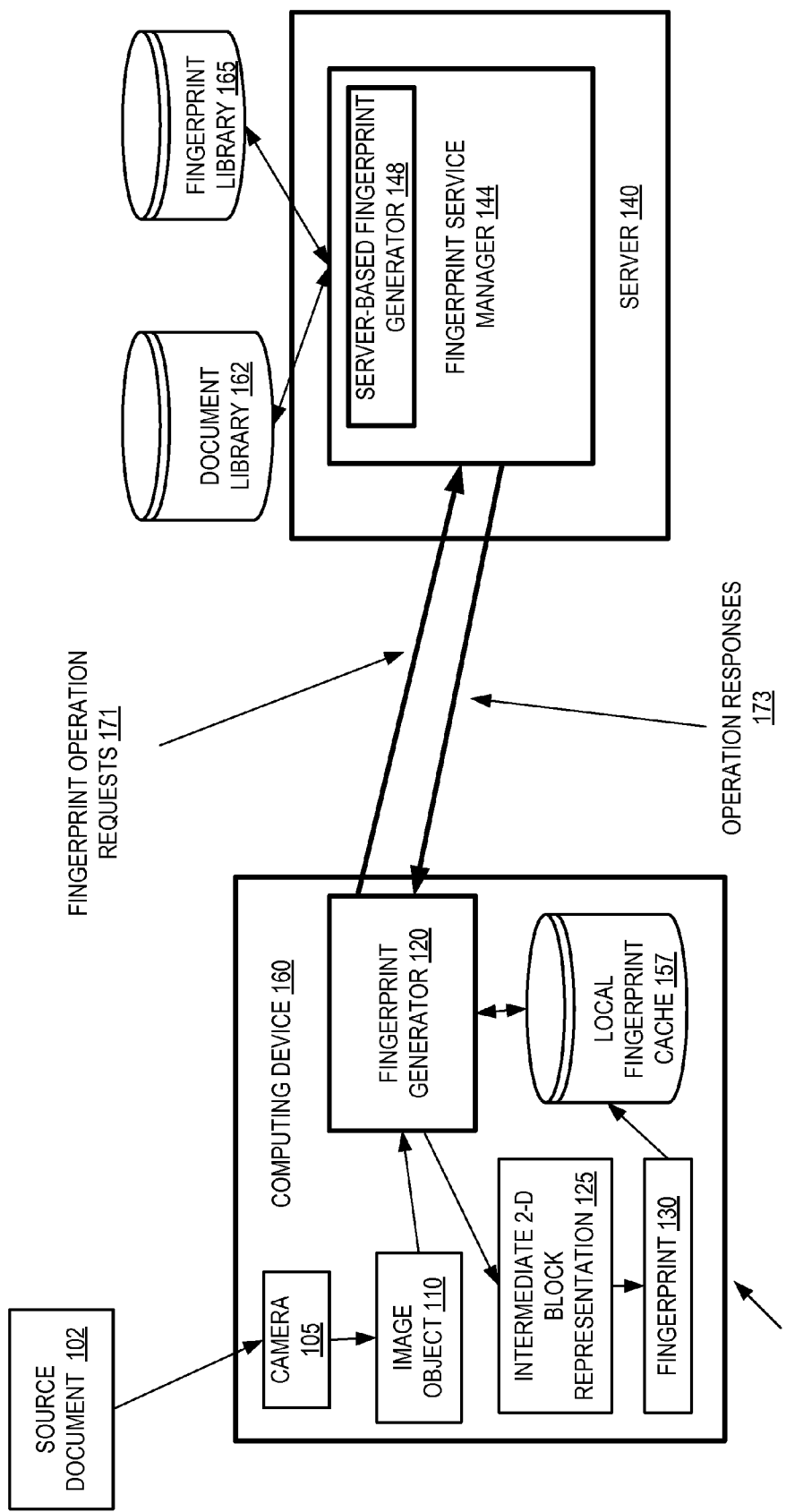
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for generating and utilizing document fingerprints using block encoding of text are described. In one embodiment, a computing device (such as a tablet, smart-phone, or a general-purpose computer system such as a personal computer, laptop, or server) may include one or more elements of a service designed to generate digital fingerprints of the text content of various types of documents based on analysis of digital images of the pages or sections of the documents. A fingerprint of a document (or a section of a document) generated with the help of such a service may serve as a unique (or near-unique, depending on various parameters of the fingerprint generation process as described below) encoding of the layout of the text in the document—e.g., of the manner in which characters, words, sentences, and/or paragraphs of different sizes are arranged within the digital image relative to one another. In some embodiments the service may allow fingerprints to be generated quickly using devices such as smart phones and tablets, with much less computing power than typical server systems. The cameras typically available on such devices may suffice for the types of images needed for the fingerprints. To trade off between compute resources used and the quality or uniqueness of the fingerprints, in some embodiments the service may offer clients the options of selecting among different levels of sensitivity during image analysis, as well as different options for the granularity with which the identified text within the images is encoded. A fingerprint generated from a given input image obtained for a particular document, or from a text provided as input by a client may, because of the relative simplicity of the encoding, be quickly compared with fingerprints generated previously from other sources. When fingerprints are generated on lower-end computing devices such as smart-phones, tablets or laptops, certain types of comparisons and/or searches may be performed locally (e.g., on the same device) in some implementations. In some embodiments, it may be possible to transmit the fingerprint to network-accessible back-end elements of the service incorporated at one or more computer servers where, for example, a repository of fingerprints may have been generated for a corresponding document repository, for more complete searches and/or comparisons. The quick generation of fingerprints, and the efficient comparison and search operations supported, may allowing rapid responses to such questions as "Which sections of version 2 of document A have changed since version 1?" or "Do I have access to documents containing text similar to the text in Section C of document D?".

According to at least some embodiments, a multi-stage process of generating fingerprints may be used. In a preliminary step, a digitized image object that contains text image elements (e.g., images of text characters or symbols, sometimes referred to as "glyphs" or "tokens") may be generated, e.g., by an internal or external camera, a scanner, using a screenshot tool, or simply by opening a file in an editor or a word processor. In a "bounding" or "grouping" stage, a fingerprint generator may detect, within the digitized image object, a number of element groups, where each element group includes one or more text image elements and is separated from other element groups of the plurality of element groups by at least one delimiter. A number of different types of delimiters may be used in some embodiments, e.g., word delimiters separating consecutive words, paragraph delimiters separating consecutive paragraphs, page delimiters separating consecutive pages, and the like. The delimiters may be defined in various ways in different embodiments—e.g., by the fingerprint generator determining the background color of the document as different from the color(s) of foreground text, and then determining how much background "space" (non-text areas) or "white space" separates the groups of interest. In some implementations, a client may be able to specify one or more delimiter properties, e.g., either indirectly by specifying "coarse" or "fine" sensitivity to the white space or background color, or directly by providing numerical values for the number of pixels or points to be used to define various delimiters, or measures of contrast or color difference to be used to distinguish between various groups or individual elements.

After the element groups have been detected, in some embodiments a block representation of the element groups may be generated, in which each element group is represented as a respective two-dimensional block whose size is proportional to the combined size of the text image elements of that element group. Thus, for example, a sequence of blocks of different sizes may be generated corresponding to the words in a sentence of text, with the block widths corresponding to the lengths of the words. Blocks of different shapes may be used in different implementations (e.g., rectangles may be used in one implementation, while triangles may be used in another implementation), or within a given implementation (e.g., rectangles and triangles may be used in the same implementation). This stage of the fingerprint generation process may be referred to as the "blocking" stage.

In the next stage, which may be termed the "encoding" or "translation" stage, the blocks may be mapped to a range of numerical values in some embodiments, e.g., with the specific value for a given block being selected based on the size of that block relative to the other blocks. In one scenario, the generator or the client may decide to use a numerical range of 0-15, so that the sizes of the blocks may be mapped using hexadecimal numerals 0 through f. The generator may in such a scenario determine the smallest block (e.g., the block with the smallest width or the smallest area) in the block representation of the text, and map that smallest block to the low value (0) of the range. The largest block may be mapped to the high end of the range (15 or f). For each of the remaining blocks, a number in the range 0-15 may be selected based on the size of the block relative to the smallest and largest blocks, e.g., a linear interpolation may be used to determine the encoding for each block. The numerical encodings of the various blocks may be concatenated to serve as the fingerprint representing the text content of the digital image in some embodiments. The generated fingerprint may be saved to persistent storage in some implementations, e.g., to a fingerprint library in which fingerprints for a set of images or documents are maintained.

If fingerprints of two different text-containing images are generated using this technique, the fingerprint of the first document may be expected to differ from the fingerprint of the second to the extent that the sequences of the words (or, more precisely, the sequences of the relative sizes of the words) of the two documents differ in at least some embodiments. The technique may not need to identify the letters or symbols of the text content, unlike some compute-intensive optical character recognition approaches, or do any analysis of semantics or meaning of the text. Instead, the fingerprint generator may simply rely on the layout of the words within the source document, and on being able to distinguish delimiters from text element groups like words or paragraphs. This approach may in general require much less processing power than that needed for character recognition. As a tradeoff for the reduced computational requirements, the fingerprint generator may (depending on the sensitivity of the image analysis, and the size of the output mapping range) in some cases generate the same numerical encoding for different fragments of text. However, as the size of the input text sequence increases, the probability that the fingerprints of two different input sequences match would at least in many cases be reduced. Furthermore, at least in some embodiments, the fingerprint generator and/or a client may tune the parameters of the analysis process and/or of the fingerprint generation process, if for example many duplicate fingerprints are generated or too many erroneous results are encountered for comparisons or searches.

A number of different types of search and/or comparison capabilities may be supported using the types of fingerprints described above in various embodiments. For example, a client may use a smart phone or a tablet computer to obtain a fingerprint of an image of a document (such as a page of a book in a bookstore, or a document received as an email attachment), and transmit the fingerprint to a server or fingerprint manager to determine whether similar documents exist in a specified collection or document library for which fingerprints have been collected previously. The server may be able to perform several different types of searches, such as substring searches to see if any of the existing fingerprints contain the newly generated fingerprint, exact-match searches to see if any existing fingerprints match the entire newly generated fingerprint, section-based searches to see if specified section(s) of existing fingerprints match the new fingerprint, and so on. In some embodiments, the server may generate metrics of similarity between different fingerprints, and provide such metrics to a client—for example, in response to a search request with a specified fingerprint as a search parameter, the server may return a list of documents with similar fingerprints, identifying one document as "more than 80% similar," another document as "more than 60% similar," and so on, based on the extent to which the encodings for the documents correspond to the encoding of the search parameter fingerprint. The client may specify desired minimum similarity levels for search results in some embodiments—e.g., the client may request that only documents whose fingerprints match at least 80% with those of a specified input text should be returned.

In some embodiments, at least some types of searches and/or comparisons may be performed at a computing device such as a smart phone or tablet, instead of at a fingerprint manager. In one simple scenario, for example, the fingerprint generator itself could perform simple analyses such as determining whether two fingerprints differ, and if so, in which sections of the corresponding texts the differences lie. The fingerprint generator may be able to search through a local cache of fingerprints (e.g., for the ten most recently viewed documents or attachments on a tablet device or phone) to identify similar documents using a newly-generated fingerprint. In some embodiments, both fingerprint generation and analysis (such as searches or comparisons) may be performed on devices with less than server-level computing capacity. In some implementations, a computing device such as a smartphone may simply transmit the image of a document or document section to another device, such as a remote server, so that the fingerprint may be generated and analyzed on a different computing device than was used to obtain the image.

The fingerprint service may implement a number of programmatic interfaces (e.g., user interfaces, integrations with various software programs such as e-mail client programs, chat client programs, imaging software, text editors, word processors, operating systems, and so on) to allow clients to initiate the generation of fingerprints, transmit fingerprints to specified destinations, submit comparison and search requests and receive the corresponding results, and/or tune the fingerprint generation and/or analysis processes in various embodiments. For example, in one embodiment, a search user interface may allow a client to type in a sequence of text into a content page (e.g., web page) form, and request that its fingerprint be generated and used to search for similar text within a document or a collection of documents. In another embodiment, an extension or enhancement to an e-mail client program may allow fingerprint generation of attachments to be requested and compared with other fingerprints. Thus, when a client receives a document via e-mail, an image or images of the document may be obtained using a command supported by the e-mail client program itself, and the fingerprint generation process for that image or those images may also be initiated from within the e-mail client program. In at least one embodiment, a client of the service may be allowed to submit tuning requests to control the sensitivity of the image analysis (e.g., to define or modify delimiters used in signature generation) or to change the range of numerical values to be used in the encoding/translation phases. As noted above, in some embodiments the service may be configured to perform automated tuning of parameters such as the delimiter definitions or mappings (e.g., based on metrics of resource usage for fingerprint generation or fingerprint-based searches, or based on client feedback received on the effectiveness of the searches, such as how accurate clients have found the searches and comparisons provided by the service, and how satisfied the clients are with the service).

In at least some embodiments, more than one fingerprint may be generated for a given document. For example, a hierarchical collection of fingerprints may be generated for a multi-page or multi-section document, with one fingerprint per page, or one fingerprint per document section, and/or one fingerprint per paragraph, or some combination of such fingerprint types. In some implementations, a single overall fingerprint may be generated and stored for an entire input document or book, in addition to separate fingerprints for sections, chapters, pages and the like for the same input. Such hierarchical fingerprints may be useful to support enhanced searches, in which for example a user may wish to specify search exclusions such as "search all the sections of these books except the headers, footnotes and indexes". A client may be allowed to request the generation of hierarchical or segmented fingerprints in some embodiments.

Multiple fingerprints may be generated for the same input text sequence in some embodiments, e.g., using different sensitivity thresholds or different encoding schemes. For example, to perform quick and rough fingerprint generation and analysis on a smart phone, a first set of delimiter definitions may be used when analyzing a document, and a first numerical range (say, 0-15) may be used for the encoding. However, for the same document, a different set of delimiters may be used on a back-end fingerprint server to generate a finer-grained fingerprint, and a larger numerical range (say, 0-100) may be used for the encoding. Thus, for the same source text, two different fingerprints F1 and F2 may be generated comprising respective sets of numerical encodings, where F1 is smaller and more coarse-grained than F2, and therefore the probability of erroneous matches with other fingerprints may be higher if F1 is used than if F2 is used. In at least some embodiments, metadata stored with a fingerprint may indicate the delimiter definitions (e.g., in pixels or points of white space or background) and/or the numerical range used for encoding. Such metadata may help prevent comparisons between fingerprints that were generated using different delimiter definitions and/or using different encoding techniques. In at least some embodiments, when a client submits a comparison request or a search request, an indication of the granularity of the fingerprints to be used for the comparison or search may be provided in the request. In one embodiment, the fingerprint service may determine which of a set of available fingerprints corresponding to the same source document or image is to be used for a search or comparison based on an estimate of resource usage that may be required for the requested operation (e.g., if the device where the search or comparison is to be conducted has a high processor utilization, a comparison using coarser-grained fingerprints may be performed). Other metadata may also be maintained for some fingerprints in some embodiments, such as an identification of the devices used for generating the images (e.g., a 300-dpi scanner, or a 10 megapixel camera), source details such as author, subject matter, keywords, date of creation and the like. In at least one embodiment, a fingerprint may include symbols or encodings of various types of delimiters, such as paragraph delimiters or chapter delimiters, which may also help facilitate enhanced searches and comparisons. For example, an encoding that uses the hexadecimal numbers 0-f for word lengths may include other symbols such as "p" for paragraph boundaries and "s" for section boundaries.

Example System Environment

FIG. 1 illustrates an example system environment, according to at least some embodiments. System 100 comprises a computing device 160 (e.g., a tablet computer or a smart phone) comprising a fingerprint generator 120 configured to communicate with a fingerprint service manager 144 hosted on a server 140. As shown, the computing device 160 includes a camera 105 that is capable of generating an image object 110 of a source document 102 (e.g., a page of a book or any text-containing document). In the depicted embodiment, the fingerprint generator 120 is configured to implement the multi-stage fingerprint creation process described above. That is, the fingerprint generator 120 may detect and group text elements, glyphs or tokens of the image object 110 using various delimiters based on the amount of white space or background space between text groups of interest, and then use the groups to create an intermediate two-dimensional block representation 125. In the block representation 125, the groups of text elements may be mapped to two-dimensional blocks whose sizes are proportional to the sizes of the groups. From the grouped elements, the fingerprint generator 120 may obtain a fingerprint 130 using an encoding or translation of the relative sizes of the blocks in representation 125 to a range of numerical values. For example, in one implementation, the smallest block (representing the shortest group of text elements, such as the shortest word) may be mapped to the low end of the range, the largest block (representing the longest group) may be mapped to the high end of the range, and other blocks may be mapped to other values of the range depending on where their size lies in the spectrum between the smallest and largest block sizes. Other types of mappings or numerical encodings, including non-linear mappings of various types, may be implemented in different embodiments.

The fingerprint 130 may thus serve as a representation of the text contents of the source document 102 that were captured in the image object 110, and the extent to which the fingerprint is unique may depend on various factors such as the resolution of the image 110, the granularity of the delimiter definitions used for detecting groups of text elements, and the range of values used for the numerical encoding. The fingerprint 130 may be used for various types of document management operations in different embodiments, such as determining whether one document differs from another, searching for similar text, identifying the specific portions of a document that have changed from a previous version, as described below. The process of generating the fingerprint 130 may not require the identification of individual symbols or characters; instead, the physical layout or relative placement of the text within the image object 110 may be used. As a result, less computing power may be needed to generate the fingerprint 130 than may be needed for other types of text analysis, e.g., for optical character recognition of the text.

With respect to document comparisons or difference analysis, the block-based fingerprint 130 may serve as a more useful representation of text content than digital signatures or checksum values obtained from document files for a number of reasons. First, for a given set of input text content, e.g., "Four score and seven years ago", the same signature 130 is likely to be generated by fingerprint generator 120, whether the text is saved in a plain text file, a portable document format (PDF) file, a word processor file, or any other file format, since the signature depends on the relative sizes of the words and the sequence of the words and not on file storage format. In contrast, the checksums for the different files (the plain text file, the PDF file or the word processor file) containing the same text are likely to be very different, so that checksums are not very useful determinants of text content differences in such a scenario. Further, using block-based fingerprints, it may be possible to determine which specific portions or regions of text differ between two documents, which may be hard to do with checksums or signatures.

In the illustrated example, the fingerprint 130 may be stored in a local fingerprint cache 157 on device 160, and various types of comparisons or searches may be performed locally with respect to other saved fingerprints in the cache. In addition, the fingerprint generator 120 may transmit fingerprint 130 to a fingerprint service manager 144 in the depicted embodiment, e.g., over a network connection. As indicated by the arrow labeled 171 in FIG. 1, several different types of operations may be supported by the service manager 144 in different embodiments, such as saving the fingerprint 130 in a fingerprint library 165, performing comparisons between the newly-generated fingerprint and previously-created fingerprints, searching for fingerprints in library 165 that represent text that is similar to the text contained in the source document 102, and so on. Responses to the operation requests 171 may be provided back to the front-end fingerprint generator 120 in some embodiments, as indicated by the arrow labeled 173. In response to a search request, for example, the fingerprint service manager 144 may provide a list of (or pointers to) a set of documents whose fingerprints match the fingerprint 130. In response to a difference analysis request, a list of sections of a document that differ (at least in their fingerprints) from corresponding sections of another document may be provided. The fingerprint manager service 144 may comprise a server-based fingerprint generator 148. The server-based fingerprint generator 148 may be used to generate fingerprints corresponding to a document library 162, and the generated fingerprints for the document library may be stored in the fingerprint library 165 in some embodiments.

Although the fingerprint generator 120 is illustrated as being incorporated on the same device 160 as a camera 105 that is used to generate an image of the source document 102 in the depicted embodiment, such a co-location of the imaging device (e.g., camera, scanner, or the like) and the fingerprint generator 120 may not be required. In general, an image from any desired source may be used, such as an internal or external still or video camera, a scanner, a screenshot, or a rendering on a display. In some embodiments, the fingerprint service may not be partitioned into separate front-end and back-end components; i.e., a single computing device such as a server computer may be configured to analyze images, generate and save fingerprints, and perform all the desired types of comparisons, searches, difference analyses, and the like. Local fingerprint cache 157 may not be implemented in some embodiments. In at least one implementation, a computing device such as a phone, tablet, or network-enabled camera may simply transmit the image 110 to a back-end service for fingerprint generation, instead of generating the fingerprint 130 locally. In some embodiments, one fingerprint 130 may be generated at a computing device using a relatively small amount of computing power, and one or more additional fingerprints for the same source document 102 may be generated at a fingerprint service manager 144 implemented by a server or other computing device. In some environments multiple fingerprints may be generated and stored for a given large source such as a book—e.g., separate fingerprints may be generated for each page or each chapter or section. Various programmatic interfaces may be implemented to support interactions with the various elements of the service, and/or for interactions between the elements of the service, in different embodiments. Tunable parameters that govern the accuracy or detail of the fingerprints and the resource usage levels for various types of search and compare operations may be implemented in some embodiments. Separate tuning parameters may be supported for the local elements such as generator 120 and remote elements such as service manager 144 or generator 148 in some embodiments. The various components of the fingerprint service may perform automated self-tuning in some embodiments, e.g., based on factors such as an analysis of resource usage for fingerprint-related operations, client feedback (e.g., user satisfaction level information) regarding the responsiveness of the system or the quality or accuracy of the results, and so on. In at least one embodiment the fingerprint service manager 144, the fingerprint library 165 and/or the document library 162 may be distributed across a plurality of compute and/or storage servers. The fingerprint functionality may be implemented as a network-accessible multi-tenant service in some embodiments, e.g., a service deployed on a plurality of physical or virtual servers of a hosted or cloud infrastructure provider.

Fingerprint Generation Overview and Example

Figure 2:
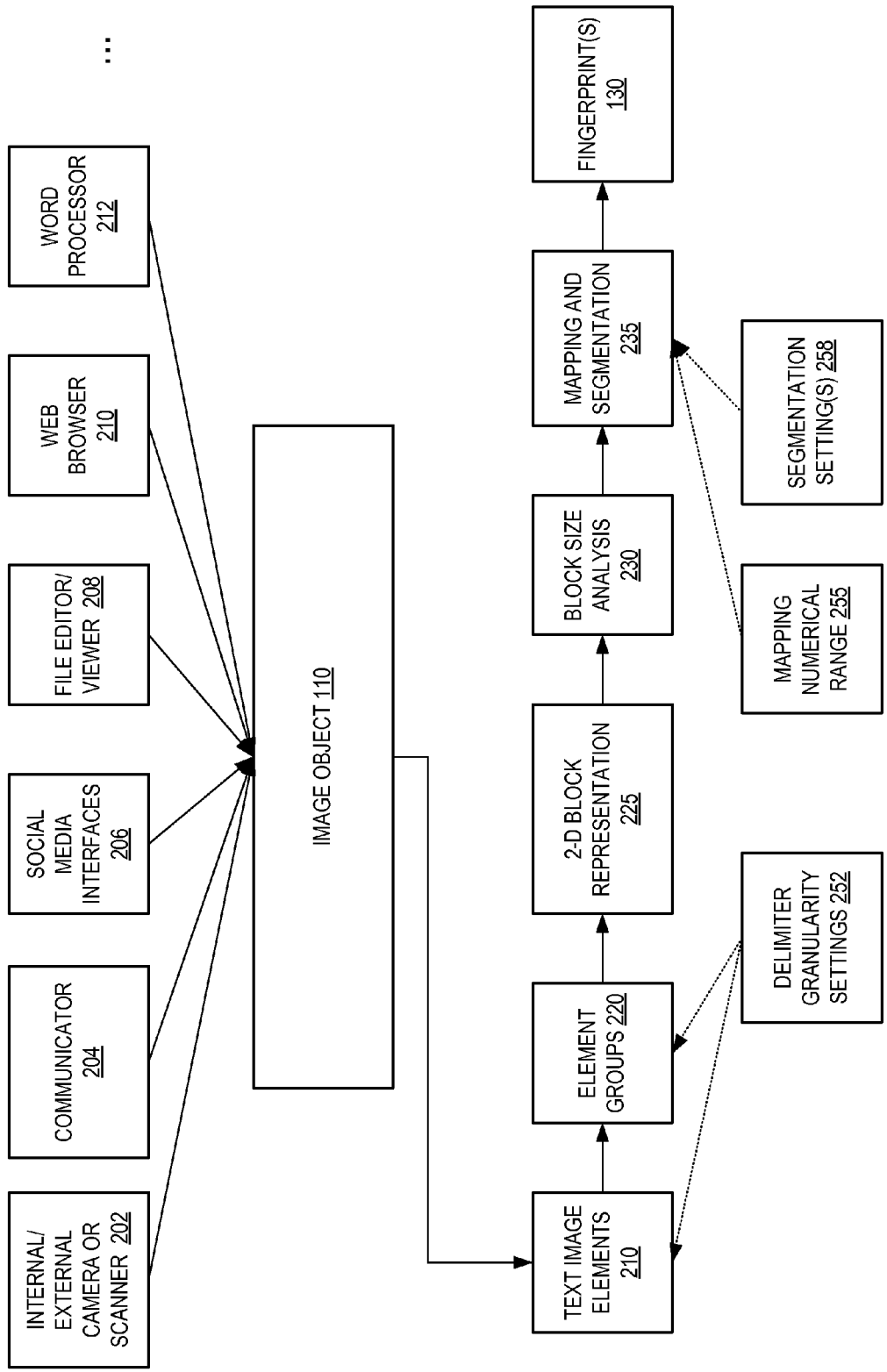
FIG. 2 provides a high-level overview of several stages of a fingerprint generation process, according to at least some embodiments.

FIG. 2 provides a high-level overview of several stages of a fingerprint generation process, according to at least some embodiments. A number of different types of sources may provide the image objects 110 for which corresponding fingerprints are to be generated. As shown, such sources may include cameras or scanners 202 that may be internal or external to the fingerprint generating device, various types of communicators 204 such as email client programs, chat or text message programs, or Voice Over Internet Protocol (VOIP) phone client programs. Text-containing images may also be obtained from various types of social media interfaces 206 in some embodiments. In various embodiments, an image object 110 may be obtained from the rendering of a document or a portion of a web site on a viewing interface such as a tablet, laptop or desktop display, e.g., by a file editor/viewer 208, a web browser 210, a word processor 212, or other software tools. For example, a partial or full screenshot of the display may be obtained by issuing a command to such a software tool, or selected portions of a document may be converted to an image at the request of a client.

A fingerprint generator may analyze a given image object to determine whether it contains text image elements 120 in the depicted embodiment. The type of analysis may differ in various implementations, depending on various factors such as the quality or resolution of the image object, the computing resources available for the analysis (e.g., a fingerprint generator 120 on a smart phone may not have as much computing capacity as a fingerprint generator 148 on a server), and so on. The fingerprint generator may for example be configured to detect the background color (in contrast to which text appears as foreground within the image object), and determine the amount of white space or non-text background space that it should use to distinguish one text image element from another. Individual text image elements may be represented using various different shapes in different embodiments, such as rectangles, triangles or N-sided polygons (where N may differ for different elements) In some embodiments clients or users may provide input to the fingerprint generator regarding such parameters as the amount of white space to be used for delimiters between text elements, e.g., by specifying desired levels of sensitivity for the analysis via delimiter granularity settings 252. In at least one implementation, the fingerprint generator may make an initial pass at detecting text elements within a portion of the image, indicate the text elements it finds in that first pass to the client, and solicit feedback from the client regarding the accuracy of its analysis. If the client indicates that the text elements have been found with acceptable accuracy, the fingerprint generator may proceed to analyze the rest of the image; otherwise, the fingerprint generator may recalibrate itself (e.g., by changing the number of pixels of whitespace to be used to distinguish between successive text elements), re-implement the initial pass, and check with the client again. The fingerprint generator may be configured to skip over non-text elements in the image object 110 (e.g., illustrations may be skipped during the analysis) in some embodiments. In other embodiments, metadata about non-text portions of a document may be generated (e.g., information about the size and location within a page of an illustration may be included as part of the metadata to be saved for the fingerprint).

After text elements or glyphs have been detected, the fingerprint generator may identify element groups 220, where each group includes one or more text elements and is separated from other groups by one or more delimiters such as word delimiters, paragraph delimiters and the like in the depicted embodiment. The grouping process may also be tuned by the client via delimiter settings 252. If no specific delimiter settings are specified, the fingerprint generator may determine the delimiters on its own in some embodiments, e.g., using various assumptions or heuristics as to how much more white space should be expected between words than between characters of a given word.

Using the detected element groups 220, the fingerprint generator may construct a two-dimensional block representation of the text 225 in the depicted embodiment. That is, corresponding to each element group, a corresponding rectangular block (or a two-dimensional object of any desired shape, such as a triangle, circle, or an N-sided polygon) may be obtained in such embodiments. The block for a particular group may be set up such that if the block were opaque, it would just cover the text of the particular group, but would not cover any portion of an adjacent group. In some implementations, all the blocks may have the same height, so that the heights of individual text elements (e.g., the heights of the letter "q" versus "o" versus "h") are not distinguished in the block representation. In implementations, the heights of different blocks may differ based for example on the fonts being used, and the heights of individual text elements. In some embodiment, shapes other than rectangles blocks may be used.

The fingerprint generator may next perform a size analysis 230 on the two-dimensional blocks. For example, in an implementation where rectangular blocks are used, one corner of each block may be designated as the origin (0, 0) on a Cartesian coordinate system for that block, and the height and width of the block may be determined in some selected units such as pixels or points. The same corner may be designated as the origin for all the blocks (e.g., if the lower left corner was considered the origin for one block, the lower left corner may be used as the origin for each of the other blocks as well). A measure of the size of each block may thus be obtained (e.g., using just the width of the block, using the area of the block if different blocks have different heights, or using other shape-dependent metrics, such as the number of sides of the polygon or the angles between adjacent sides of a polygon in an implementation where polygons are used). The sizes of largest block and the smallest block in the block representation 225 may be identified during size analysis 230, as well as the sizes of each of the other blocks. Depending on the text input and delimiters used, there may be multiple smallest or largest blocks (e.g., if the blocks represent words, several different blocks corresponding to various occurrences of the word "a" in the text may all be equally-sized "smallest" blocks), in which case the size of any one of the smallest blocks may be chosen as the smallest block size of the two-dimensional block representation, and the size of any one of the largest blocks may be designated as the largest block size.

The sizes of the blocks may then be mapped to one or more ranges of numerical values in a mapping and segmentation phase 235 of the process in the depicted embodiment. In one implementation, for example, where rectangles of equal heights are used for the blocks, the width of each rectangle in pixels may be mapped directly to the numerical values. In other implementations, the sizes may themselves be encoded before the mapping is performed (e.g., a color coding scheme may be used to represent the various block sizes, such that the numerical value for a given block is determined based on the color coding for the block rather than directly from the width of the block in pixels). The range of output numerical values 255 to be used for the numerical encodings may be selected either by the fingerprint generator itself or based at least partly on client input in some embodiments. In one straightforward implementation, for example, where a range of 0-9 is selected, the smallest block size may be mapped to 0, the largest block size may be mapped to 9, and the other blocks may be mapped to values between 0 and 9 (inclusive) based on their where their sizes lie between the smallest and largest sizes. If block width is the metric of size, and the smallest block is 5 pixels in width while the largest block is 75 pixels wide, the sizes of the blocks may be mapped as follows: 5-11 pixels map to 0; 12-18 pixels map to 1; 19-25 pixels map to 2; 26-32 pixels map to 3; 33-39 pixels map to 4; 40-46 pixels map to 5; 47-53 pixels map to 6; 54-60 pixels map to 7; 61-67 pixels map to 8; and 68-75 pixels map to 0. Non-linear mappings may be used in some embodiments. The generated mappings or numerical encodings may then be concatenated to form the fingerprint 130 for the input image object 110 in the depicted embodiment. In at least one embodiment, the sequence of mappings of the various block sizes may be compressed, or other computations or transformations may be performed on the mappings instead of simply concatenating the mappings to determine the fingerprints.

In some embodiments, instead of (or in addition to) generating a single fingerprint for a given input image or document, several different fingerprints may be generated (e.g., one fingerprint for each section or one fingerprint for each paragraph). In some implementations, client-specified segmentation settings 258 may be used to determine whether multiple fingerprints are to be generated, and if so, to determine the criteria on which the input is to be divided for the various fingerprints. The generated fingerprints may include symbols for various delimiters in some embodiments (e.g., so that it becomes possible to determine where paragraph boundaries or section boundaries lie within the text).

Figure 3:
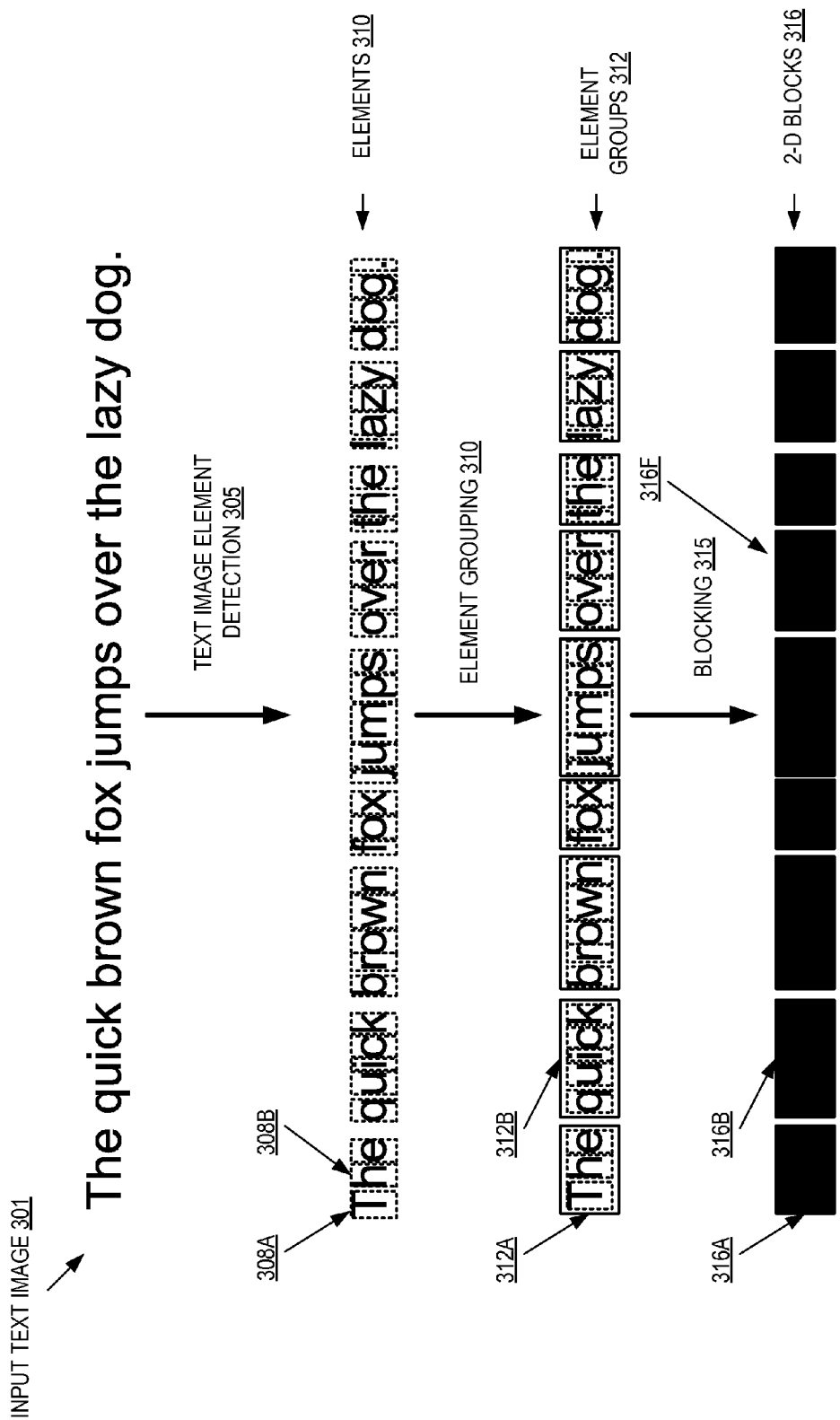
FIG. 3 illustrates the generation of two-dimensional block representation of example text, according to at least some embodiments.

FIG. 3 illustrates the generation of two-dimensional block representation of example text, according to at least some embodiments. As shown, the example input text image 301 comprises the sentence "The quick brown fox jumps over the lazy dog." In a text image element detection step, indicated by arrow 305, the input text image 301 is divided into a sequence of text elements 308, such as element 308A corresponding to the initial letter "T" and element 308B corresponding to the next letter "h". Although the detected text elements 308 are represented as small rectangular shapes in FIG. 3, in some embodiments shapes other than rectangles (such as triangles, rounded rectangles, or circles) may be used, or combinations of multiple shapes may be used. In a grouping operation 310, the text elements 308 are then combined into groups 312, such as group 312A corresponding to the elements for "T", "h" and "e", and group 312B corresponding to the elements for "q", "u", "i", "c" and "k". The detection of individual text elements and the grouping may both be governed by parameter settings as discussed earlier (e.g., parameters that define the amount of separation or white space to be used to distinguish between successive text elements or between successive groups). Once the groups 312 have been determined, the fingerprint generator may generate blocks 316 in blocking step 315, such as block 316A corresponding to the element group for the word "The" and block 316B for the element group representing "quick." In the example shown, blocks of equal height are generated for all the groups 312, so that the blocks extend above and below the average heights of the letters to adequately cover "taller" letters (such as "T", "k", "b", "q", "j", "p" or "y"), regardless of whether a particular element group includes those taller letters (for example, "over" does not contain one of the taller letters, but its block 316F has the same height as the other blocks). In other implementations, some of the blocks may be of different heights than others. In some embodiments, shapes other than rectangles (or combinations of multiple shapes) may be used, instead of the rectangular blocks 316. It is noted that the fingerprint generator may not need to recognize the letters or the words to arrive at the blocks in the depicted embodiment; instead, only the relative locations of the text image elements, the relative sizes or lengths of the words, and their positions within the sequence of text may have to be determined. In some embodiments, instead of generating two-dimensional blocks corresponding to the presence of text element groups, the fingerprint generator may generate blocks corresponding to the absence of the text element groups (e.g., blocks may be generated to represent white space or background color between the element groups, instead of representing the element groups themselves).

Figure 4:
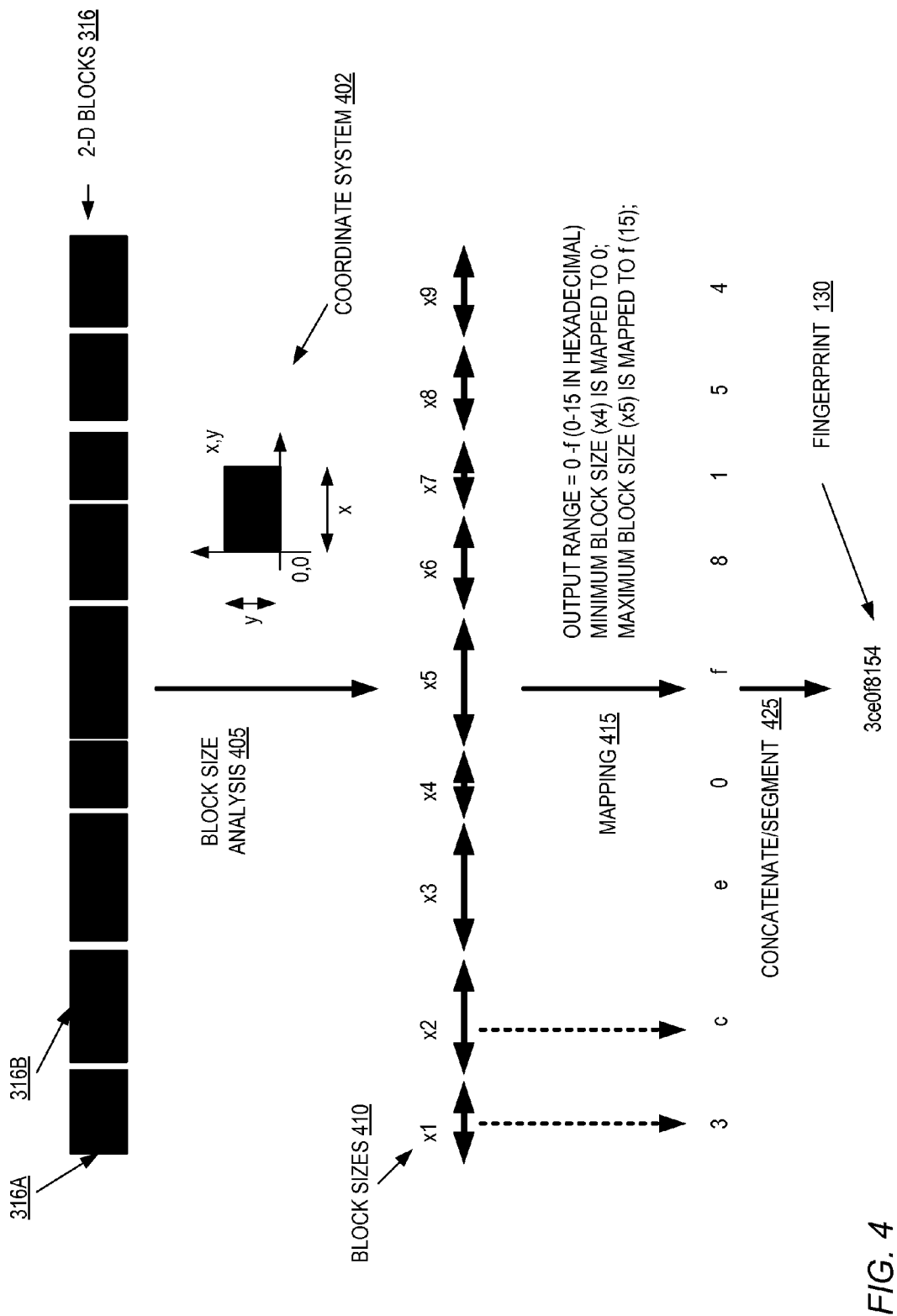
FIG. 4 illustrates the generation of a numerical fingerprint from the two-dimensional block representation of the example text of FIG. 3, according to at least some embodiments.

FIG. 4 illustrates the generation of a numerical fingerprint from the two-dimensional block representation of the example text of FIG. 3, according to at least some embodiments. The two-dimensional blocks 316 of FIG. 3 are redisplayed at the top of FIG. 4. In a block size analysis step illustrated by the arrow labeled 405, the fingerprint generator may establish a consistent coordinate system to be applied to each of the blocks 316, such as coordinate system 402 in which the lower left corner of each block is designated as the origin (i.e., the point with (x, y) coordinates set to (0, 0)). Using the coordinate system, a measure of the size of each block 316 may be obtained. In the depicted embodiment, the extent of the blocks 316 along the x-axis (i.e., the width of the blocks) is used as the measure of block size, as indicated by the double arrows x1, x2 and so on. The widths may be determined in any desired unit such as pixels, dots, points, and the like. In other embodiments, where for example the heights of different blocks may vary, the area of a block or some other function of the width and the height may be used as the metric of block size.

The block sizes 410 may then be translated or mapped to a sequence of numbers selected from a numerical range in mapping phase 415 in the depicted example. An output numerical range of 0-15 (0-f in hexadecimal notation) has been selected for the numerical encodings, with the smallest block size (x4) being mapped to 0, the largest block size (x5) being mapped to f, and the remaining block sizes being mapped to some value between 0 and f using linear interpolation between the block sizes x4 and x5 (e.g., x1 is mapped to 3, and x2 is mapped to c). The mapping results or numerical encodings may be concatenated to obtain the fingerprint 130 in the depicted example. Thus, the image of the text "The quick brown fox jumps over the lazy dog." may be represented by the fingerprint string "3ce0f8154". For longer text input, in some embodiments the fingerprint generator may produce multiple shorter fingerprints instead of or in addition to one large fingerprint (e.g., one fingerprint may be generated for each paragraph or section of text identified in the image). In at least some embodiments, an intermediate encoding may be generated from the blocks before the numerical values are determined. For example, a color-coded representation of the block sizes may be generated, and the combination of colors used for different blocks may be used to generate the numerical values for the fingerprint (instead of using the width, height or area directly).

It is noted that in general, the encoding or mapping output for a given element group (which is based on the size of the blocks generated) may not necessarily indicate the number of characters or symbols corresponding to the group (e.g., the word "The" is mapped to "3" in the example shown, "fox" is mapped to "0", the second "the" is mapped to "1" even though all those words have three letter each). Thus the fingerprint may depend on the size of the words (and other element groups) as detected by the fingerprint generator, and the way that the blocks are generated, measured, and mapped, rather than on the linguistic content of the text. In some embodiments, instead of mapping the block sizes to a range of numerical values, the blocks may be mapped to other, non-numerical symbols or characters.

It is also noted that the fingerprint generation process may sometimes include errors, and that it may nevertheless be possible to perform searches and comparisons with reasonable accuracy in at least some embodiments. For example, a particular word W1 that takes up more pixels than word W2 in an image object for a document D1 may be mapped erroneously to an output numeral N1 that is smaller than the numeral N2 to which W2 is mapped, or two words of D1 may be combined into one erroneously. However, depending on the size of the text sequence being compared or searched for (and of course on the number of errors as a fraction of the size of the text sequence), the fingerprint service may still be able to identify documents that largely match D1, or successfully determine that D1 differs from another document D2. Thus the fingerprint service may be resilient to a certain proportion of errors in various embodiments.

Methods of Fingerprint Generation and Usage

Figure 5:
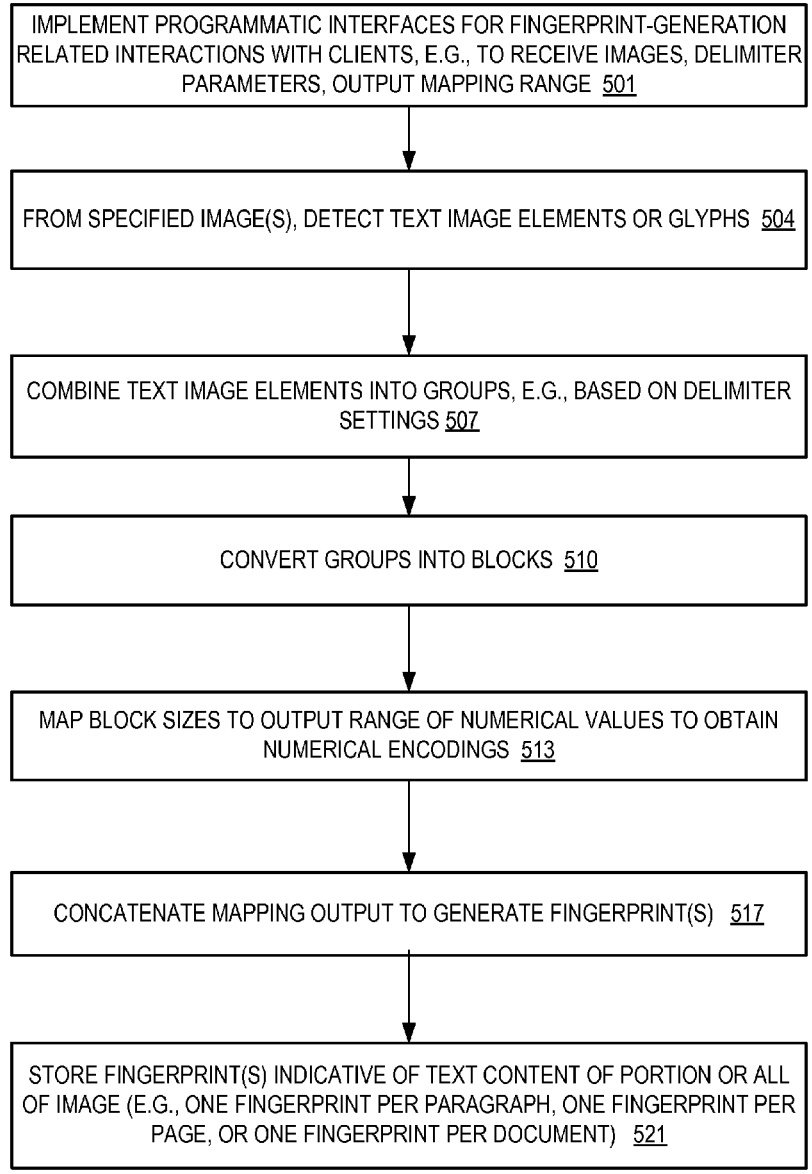
FIG. 5 is a flow diagram illustrating aspects of the operation of a fingerprint generator, according to at least one embodiment.

FIG. 5 is a flow diagram illustrating aspects of the operation of a fingerprint generator, according to at least one embodiment. As shown in element 501, one or more programmatic interfaces may be implemented to support client fingerprint generation-related interactions (e.g., to allow clients to submit images or documents for which fingerprints are to be created, to allow clients to provide parameters or preferences such as delimiter sensitivity settings, numerical mapping ranges or functions, and so on). The programmatic interfaces may include, for example, web pages or web sites, APIs, extensions or plug-ins to e-mail client programs, social media client programs, web browsers, word processors, text editors, or to the operating system in use at a client device such as a tablet, camera, smart phone, or general purpose computer system. The fingerprint generator (e.g., either at a server 140 or at a client computing device 160) may receive an image containing text elements via one such programmatic interface. In some embodiments, a reference to an existing collection of documents or images may be provided, and the fingerprint generator may generate fingerprints for all or some subset of the specified documents without needing individual requests for each document or image separately.

As indicated in element 504 of FIG. 5, the fingerprint generator may detect the presence of text image elements or glyphs within the source image object. Such detection may depend on the ability of the fingerprint generator to identify a background color in the image that is distinct from the text color, and on its ability to distinguish contrasts between text image elements and the background or white space. The fingerprint generator may then combine the detected image elements into groups (element 507 of FIG. 5), e.g., based on one or more delimiter settings or definitions either indicated by the clients or determined by the generator itself. In some embodiments, a number of different types of delimiters may be defined, such as word delimiters, paragraph delimiters and the like, and the fingerprint generator may use all or a subset of the delimiters during the grouping stage. In at least some implementations, in addition to determining the element groups, the fingerprint generator may also include generate representations of at least some of the boundaries it detects in the text, such as paragraph or section boundaries.

The element groups may then be converted into a sequence of two-dimensional blocks in the depicted embodiment, as shown in element 510 of FIG. 5, where the size (e.g., the width or the area) of each block is proportional to the combined size of the elements of the corresponding group. The fingerprint generator may then determine measures of the sizes of the blocks (e.g., by finding the width in pixels of each block). Any of various different geometrical shapes may be used for the two-dimensional representation (e.g., rectangles, other quadrilaterals, ellipses, rounded rectangles, triangles or circles) in various implementations, as long as a size metric of the shape can be determined efficiently. Similarly, individual text image elements (e.g., for a character) may also be represented in some embodiments using non-rectangular shapes. Combinations of shapes may be used in some embodiments, such as several different triangles to cover the different sections of a capital letter "T". Different size metrics may be used in different embodiments, depending on the shapes being used. For example, if triangles are used, a size metric may be based at least in part on the angles between a pair of adjacent sides of the triangle. If polygons with arbitrary numbers of sides are being used, sizes may be represented based at least partly on the number of sides. To obtain the numerical encodings for the fingerprint, the block sizes may then be mapped to an output range of numerical values (element 513), where the range may either be selected automatically by the fingerprint generator or may be determined based on client input via one of the programmatic interfaces. For example, the smallest block may be mapped to low end of the numerical range, the largest block may be mapped to the high end, and other blocks may be mapped using linear interpolation to some value in the range based on their sizes relative to the smallest and the largest blocks. Other types of mappings may be used in some embodiments to obtain the numerical encodings. In one embodiment, a non-linear mapping based on the shape of the block size distribution curve may be used, so that a roughly equal number of words is mapped to a given numeral of the output range. Consider an example where the output mapping range is 0-9, the minimum block size is 10 pixels, the maximum is 110 pixels, and most blocks lie in the range 40-60 pixels. In such a scenario, instead of dividing the output range into equal sub-ranges of 10 pixels each, where 10-19 pixel blocks are mapped to 0, 20-29 pixel blocks are mapped to 1, and so forth, a different mapping may be used in which the range 40-60 pixels is mapped to three or four of the ten output range numerical values.

The mapping output may be concatenated to generate the final fingerprint (element 517). In some embodiments multiple fingerprints may be generated for different parts of the same image or the same document (e.g., one fingerprint per page, or one fingerprint per paragraph). In another embodiment, as described below with reference to FIG. 6, fingerprints using different output range sizes may be generated for the same text input. For example, a smaller output range 0-7 may be used for less accurate or less unique fingerprints to be used for rough comparisons or first-order searches, while a larger output range such as 0-127 may be used for more fine-grained fingerprints so that the likelihood of the same fingerprint being generated for two different input text sequences is reduced. The generated fingerprints representing the text contents of the input image or document may be stored in one or more repositories in some embodiments, such as a fingerprint library and/or a fingerprint cache.

Figure 6:
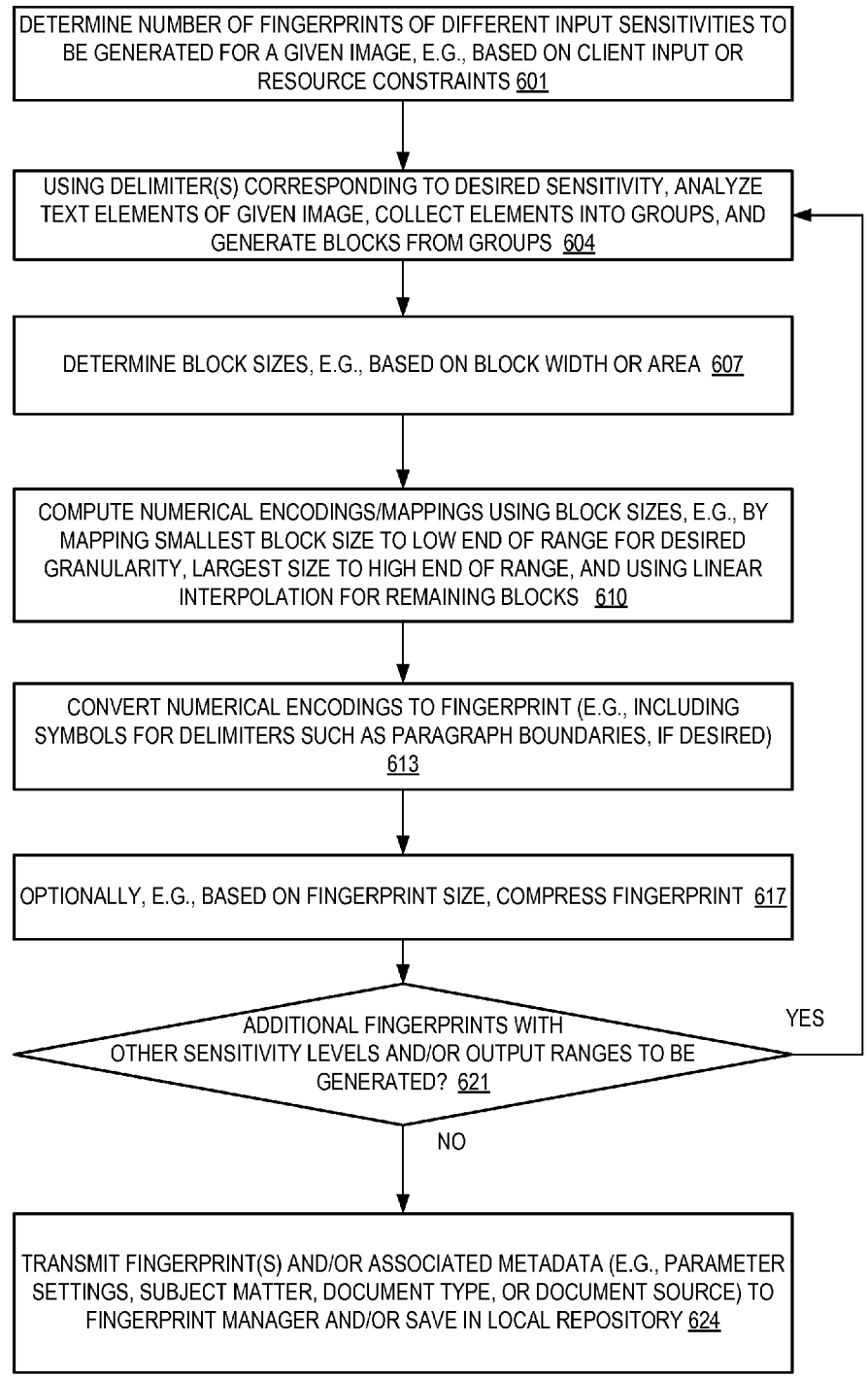
FIG. 6 is a flow diagram illustrating aspects of the operation of one or more fingerprint generators configured to create several different fingerprints from the same input text, according to at least one embodiment.

FIG. 6 is a flow diagram illustrating aspects of the operation of one or more fingerprint generators configured to create several different fingerprints from the same input text, according to at least one embodiment. In the depicted embodiment, the fingerprint generator determines the number of fingerprints of different input sensitivities that are to be generated (element 601), for example based on parameters specified by clients or based on the resources available. In one scenario, for example, a client may indicate that two types of fingerprints are to be generated—"coarse-grained" fingerprints that may be used for rough comparisons or searches on mobile devices such as phones or tablets, and "fine-grained" fingerprints that may be used for more accurate comparisons or searches on more computationally powerful servers. The different types of fingerprints may be generated using different delimiter definitions, and may be generated on different devices from the same input image—e.g., the coarse-grained fingerprints may be generated on mobile devices and the fine grained fingerprints may be generated on servers. In some embodiments different fingerprints may be generated from different images of the same input text—e.g., one fingerprint from a low-resolution image and another fingerprint from a higher-resolution image. Using the appropriate sets of delimiters for a given sensitivity level, a fingerprint generator may analyze the text elements of a given input image, collect the text elements into groups, and generate two-dimensional blocks for the element groups (as indicated in element 604 of FIG. 6).

The sizes of the blocks may then be determined, e.g., based on computing the widths of the blocks or the area of the blocks (element 607). The block sizes may then be mapped to a range of numerals to obtain numerical encodings (or any other desired symbols), using linear interpolation or some other mapping approach (element 610). If linear interpolation is used, as described earlier, the smallest block may be mapped to the low end of the output numerical range, the largest block may be mapped to the high end, and the other blocks may be mapped to respective numerals on the range based on their relative sizes. Different output numerical ranges may be used for the different types of fingerprints—e.g., for coarse-grained fingerprints an output range of 0-9 may be used while for fine-grained fingerprints, a range of 0-100 may be used in some embodiments. The output of the mapping (e.g., the numerical encodings) may be concatenated or otherwise combined to arrive at the fingerprint for the desired sensitivity level (element 613). In some embodiments, symbols for the delimiters may be included in the fingerprint, so for example it is possible to determine where paragraph or section boundaries occurred in the input text. In at least one embodiment, the fingerprint may optionally be compressed using any desired compression algorithm (element 617) (e.g., if the size of the fingerprint exceeds some threshold).

If more fingerprints (for additional parameter settings such as delimiter sensitivities and/or output ranges) are to be generated (as determined in element 621), the operations corresponding to elements 604 onwards may be repeated for the next set of parameters. Eventually, in the depicted embodiment, the various fingerprints and associated metadata such as the parameter settings used, the subject matter of the input text, the document source (e.g., scanner, camera, or screenshot), and/or the document type (e.g., a page of a book, or an email attachment) may be transmitted for storage to a fingerprint manager or repository (element 624). In some cases fingerprints may be saved in a local cache (e.g., on a mobile device) instead of or in addition to being sent to a fingerprint manager.

Figure 7:
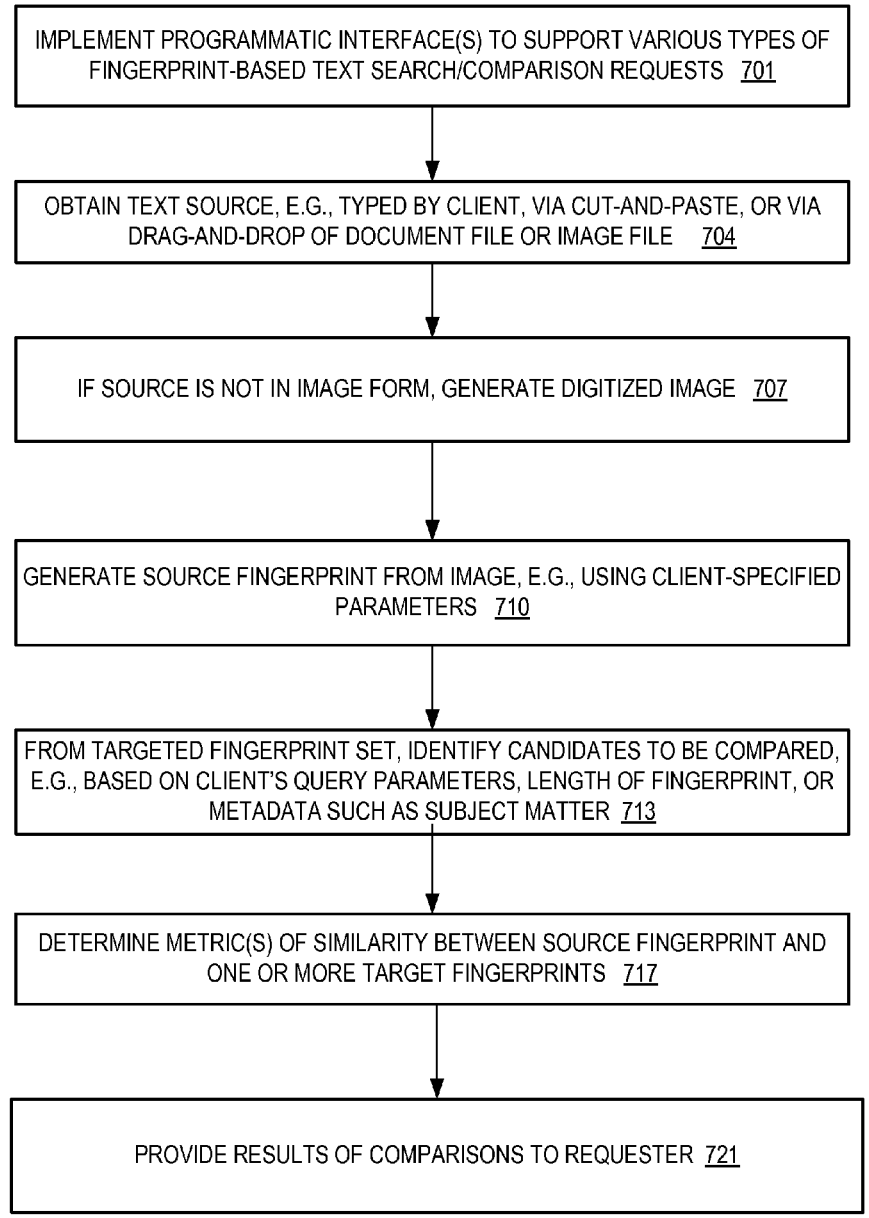
FIG. 7 is a flow diagram illustrating aspects of the operation of a fingerprint service configured to support document comparisons and searches, according to at least one embodiment.

FIG. 7 is a flow diagram illustrating aspects of the operation of a fingerprint service configured to support document comparisons and searches, according to at least one embodiment. The fingerprint service may be implemented using one or more local tools (e.g., applications that run on client devices such as phones or tablets), network-accessible interfaces of a multi-tenant service run on servers, or some combination of local and remote components in various embodiments. One or more programmatic interfaces may be implemented to receive and respond to fingerprint-based text search requests or comparison requests, as shown in element 701. A number of different variants of search/comparison requests may be supported in some embodiments. For example, in additional to exact match searches (the equivalent of "find any documents that contain the exact text T"), positional searches (e.g., the equivalent of "find documents that begin with text T" or "find documents that end with text T"), section-based searches (e.g., the equivalent of "find documents in which the Abstract section contains text T"), partial match searches with specified similarity levels (e.g., the equivalent of "find documents that contain text passages that match at least 80% of the words of T"), and other types of searches may be supported in some embodiments. Comparison requests supported may include equality comparisons (e.g., the equivalent of "Is the text T different from the text of document D?"), section-based comparisons (e.g., "Which sections, if any, differ between documents D1 and D2?"), among others, in some implementations. For searches and/or for comparisons, the client may be allowed to specify exclusion and/or inclusion parameters in some implementations—e.g., the equivalent of "search only in the index sections of the documents." In at least some implementations, clients may specify groups of documents or fingerprints against which the searches or comparisons are to be directed (e.g., a client may indicate that a search should be conducted among fingerprints corresponding to documents stored in the "contracts" directory of a file system).

In the depicted embodiment, the fingerprint service may obtain the text source which is to be searched for or compared, using one of the programmatic interfaces (element 704). For example, a client may simply type in the search text into a web form element in some implementations, cut-and-paste some text, or indicate a document file or image file via drag-and-drop or by providing a pathname. If the source is not already in the form of an image, a digitized image may be generated from the source (element 707), e.g., by saving a screenshot as a JPEG file in some embodiments. The fingerprint of the source text may then be generated from the image using the techniques based on two-dimensional block representations described above (element 710). Client-specified parameters regarding the delimiters and/or the output mappings may be used to generate the source fingerprint.

From the target fingerprint set (e.g., the set of fingerprints to be searched, or compared with the newly generated fingerprint), the fingerprint service may identify some subset of candidates to be searched or compared in the depicted embodiment (element 713). Such filtering may be based on any of various factors in different implementations, such as client-specified query parameters (e.g., "search only in directory D"), metadata matching (e.g., the service may examine only those targets with similar metadata, such as similar subject matter, delimiter definitions and output mapping range, as the source text), size matching (e.g., if an exact match or a 90% match is desired, some of the targets may be eliminated as candidates because the lengths of the target fingerprints differ substantially from the length of the source fingerprint). The service may then perform the requested searches or comparisons, and determine metrics of similarity (e.g., what fraction of the target fingerprint matches the source) (element 717). The results of the analysis may then be provided to the requesting client (element 721). It is noted that in various embodiments, some of the operations illustrated in FIGS. 5, 6 and 7 may be performed in a sequence other than that shown, and that some of the illustrated operations may be omitted or performed in parallel with other operations.

Example User Interfaces

Figure 8:
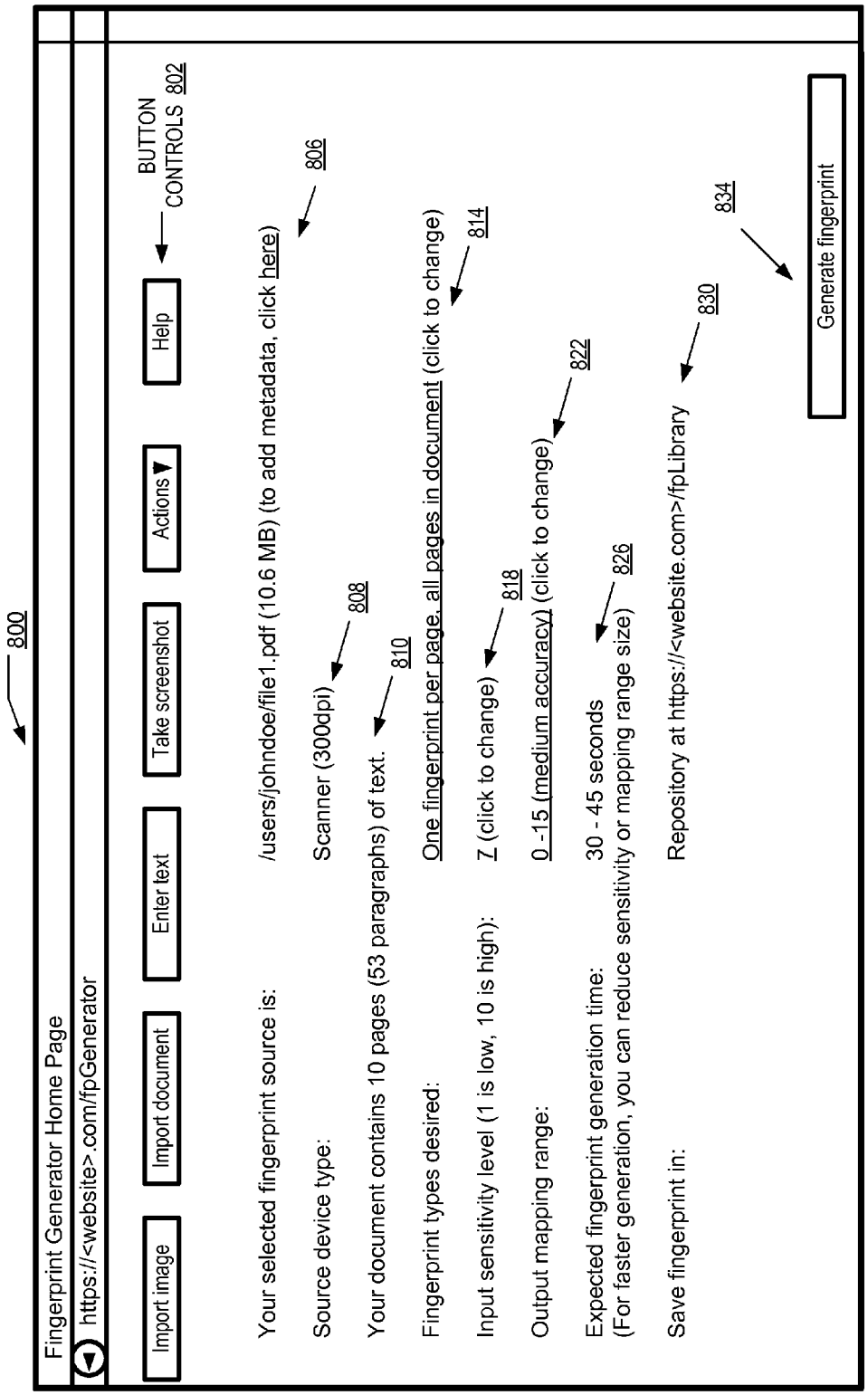
FIG. 8 illustrates a portion of an example user interface that may be implemented to allow clients to request generation of a fingerprint, according to some embodiments.

FIG. 8 illustrates a portion of an example user interface that may be implemented to allow clients to request generation of a fingerprint, according to some embodiments. As shown, the interface may include a content page 800 with several button control elements 802 that a client may use to import images or documents, to enter text for which a fingerprint is to be created, to take a screenshot to serve as the input image, and/or perform other desired actions (e.g., using the "Actions" button) such as setting global fingerprint-related preferences or settings. In the depicted example, the client has specified a file with a path "/users/johndoe/file1.pdf" as the source for the fingerprint (as indicated the element 806 of content page 800). A clickable link is provided for the client to enter metadata about the source, as indicated by the text "to add metadata, click here."

In the depicted example, the service has determined the source device (a 300 dots-per-inch scanner, as indicated by arrow 808) from which the file was generated. The interface provides summary information about the document to the client, such as the number of pages and paragraphs (arrow 810). The client may specify the desired fingerprint types (e.g., one per page, one per section etc.) using clickable link 814. A field labeled "input sensitivity level" indicated by arrow 818 allows the client to modify the sensitivity of the image analysis to be used for detecting text contents of the source file; in the example shown, sensitivity settings between 1 (low sensitivity, e.g., to whitespace or color differences or contrast levels) and 10 (high sensitivity) are possible. In addition, the client may specify an output mapping range (such as the illustrated 0-15 range which corresponds to "medium accuracy") as indicated by arrow 822. Given the current set of parameter settings for types of fingerprint, sensitivity and output mapping, and the size of the document, the service has provided an estimate of the fingerprint generation time (arrow 826), along with a suggestion that the sensitivity or mapping range may be reduced to speed up fingerprint generation if desired. The client may specify a destination where the fingerprint is to be stored using the "Save fingerprint in" field (arrow 830). Button 834 labeled "Generate fingerprint" may be used by the client to initiate the process of creating the desired fingerprints.

Figure 9:
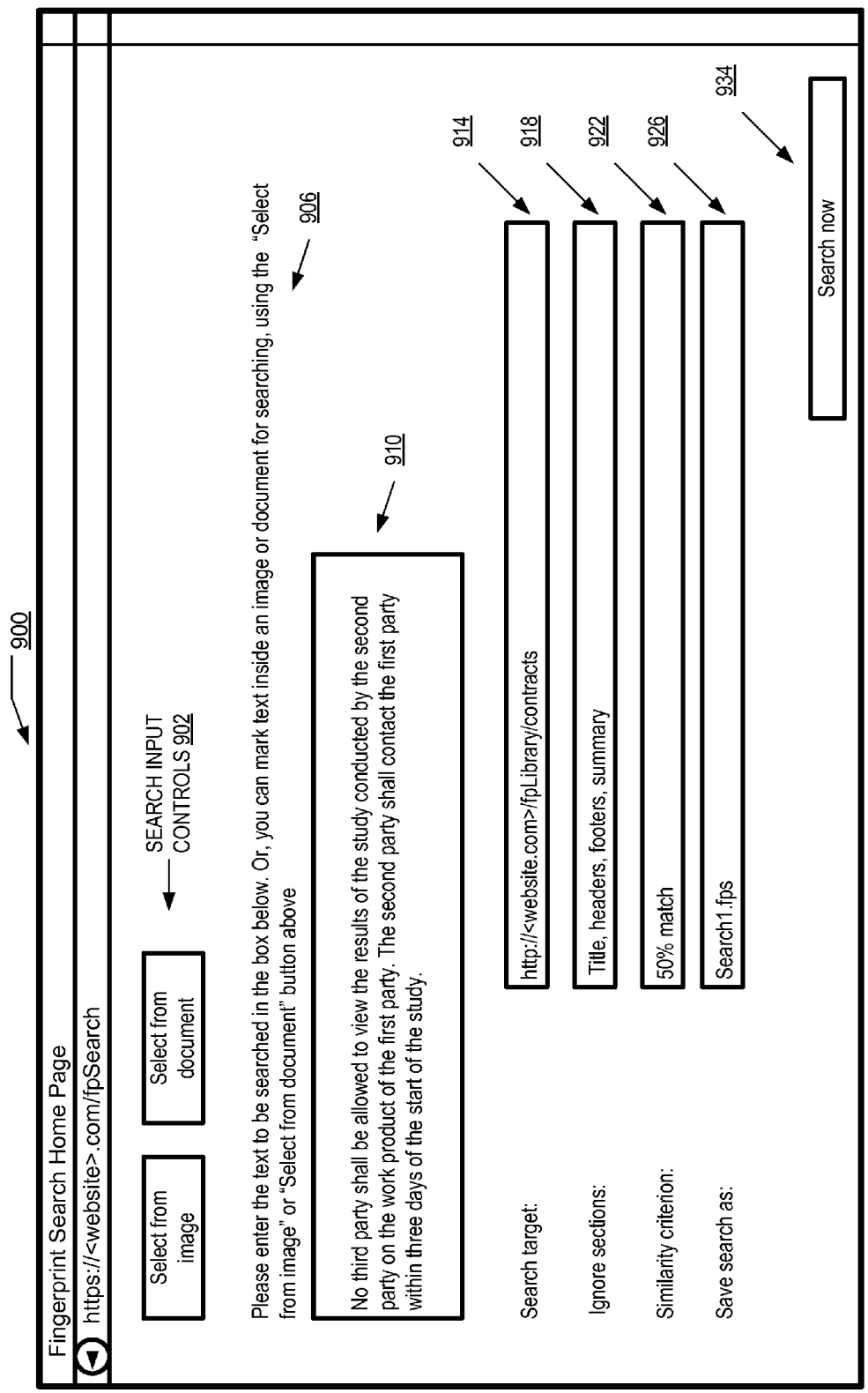
FIG. 9 illustrates a portion of an example user interface that may be used to allow clients to submit fingerprint-based search requests, according to some embodiments.

FIG. 9 illustrates a portion of an example user interface that may enable clients to submit fingerprint-based search requests, according to some embodiments. The interface includes content page 900 with a number of control elements such as buttons "select from image" or "select from document" that may be used to specify the text to be searched. In the depicted example, a client may type in search text directly into text box 910. The client may specify targets against which the search is to be conducted using field 914 (e.g., as shown, a collection of fingerprints stored in a "fpLibrary/contracts" section of a web site is to be searched). The client may indicate sections of the target documents to be ignored during the search using field 918 (e.g., the search may be conducted against the contents of sections other than "title, headers, footers, and summary" sections). Using field 922, the client may specify desired similarity criteria, such as a minimum percentage of word matches for a successful search. The parameters of the search, including the input text, may be saved (e.g., for potential re-use) to a specified destination using field 926. The client may issue the search request using button 934 labeled "Search now" in the depicted embodiment.

It is noted that although the fingerprint generation and search interfaces shown in FIG. 8 and FIG. 9 are implemented as displaying web or content pages, various other types of interfaces may be used to accomplish similar functions in different embodiments. For example, fingerprint generation, search and/or comparison functionality may be supported using smart phone applications downloadable from a network-accessible application store, or may be implemented as plug-ins to operating system components or browsers in various client devices. Command-line tools, APIs, or custom GUIs may be used in other embodiments.

Use Cases

The techniques described above of efficiently generating fingerprints based on placement and layout of text elements within images, and facilitating parameterized searches and comparisons using such fingerprints, may be beneficial in a variety of environments. In one example, an employee participating in contract negotiations may be able to use such techniques to very quickly determine exactly which sections of a revised contract document (received via e-mail or in paper form) have changed since the previous version. Such a change analysis may be initiated from a mobile device such as a phone or a tablet where the new version of the contract is received as an e-mail attachment via an email client program enhanced to support fingerprint operations, and the change analysis may be implemented without recourse to compute-expensive character recognition techniques. Similarly, fingerprint-based comparisons and difference analysis may be used effectively in any process in which documents undergo editing/revision iterations, such as patent application preparation, magazine article revisions, book revisions, and the like.

It may also be possible to use fingerprint services for detection of plagiarism or improper re-use of text. For example, publishers may use fingerprint searches to determine whether a portion of a to-be-published book or article is unexpectedly similar to previously-published material. Teachers may use fingerprint searches to determine whether student-submitted essays or reports are original as claimed. It may also be possible to use fingerprints to make shopping easier in some scenarios—for example, a customer may take a picture of a page of a book and submit it to an online bookstore to find the online price of the book (or similar books). Fingerprints may also be used to help organize documents within hierarchies such as file systems—for example, when a client creates a new document using a word processor enhanced with fingerprint capabilities, the word processor may be able to direct the client to save the document in a location or directory where similar documents have been stored previously.

Illustrative Computer System

Figure 10:
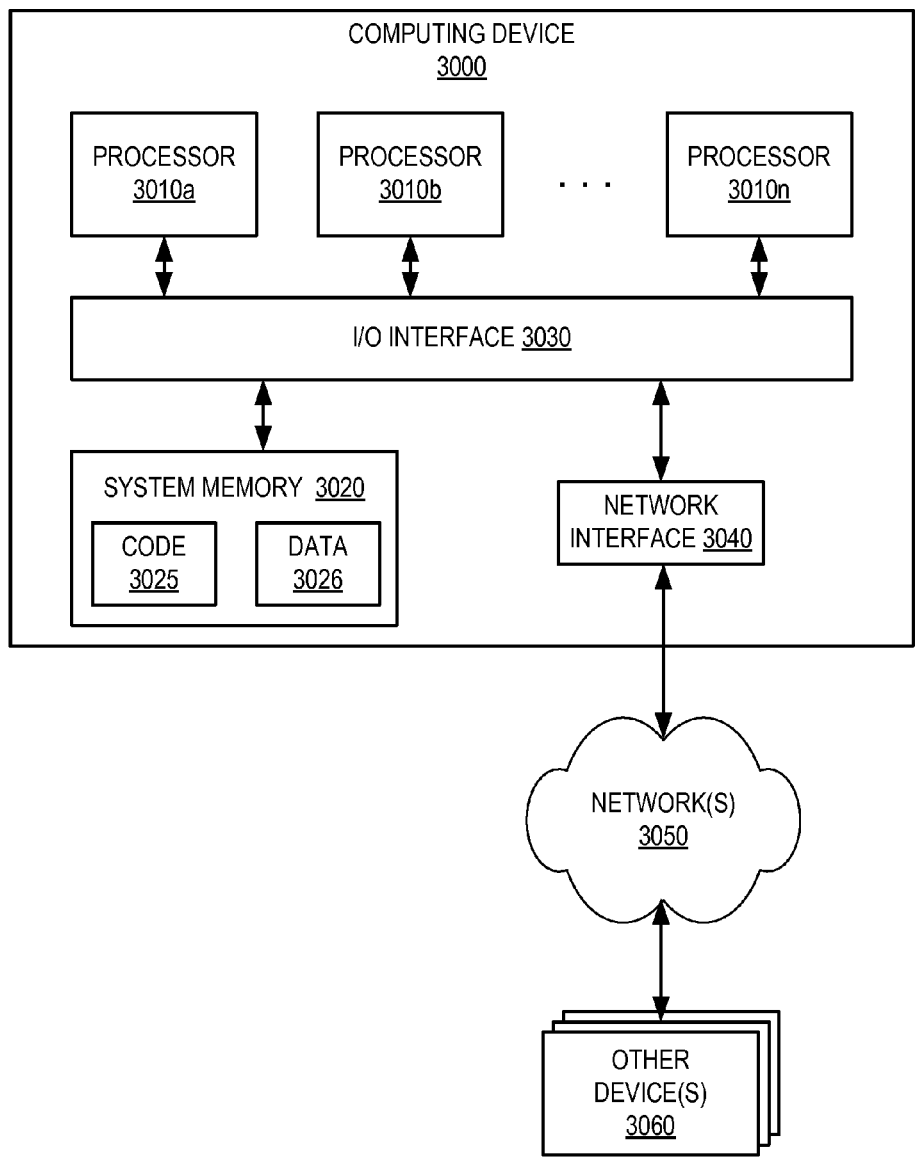
FIG. 10 is a block diagram illustrating an example computing device that may be used in some embodiments.

In at least some embodiments, a server that implements a portion or all of one or more of the technologies described herein, including the techniques to implement the functionality of the fingerprint generators and/or the fingerprint service, may include a general-purpose computer system that includes or is configured to access one or more computer-accessible media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of non-transitory computer-readable storage media. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 9, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a non-transitory computer-readable medium configured to store program instructions and data as described above for FIG. 1 through FIG. 9 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a non-transitory computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc.

The various methods as illustrated in the Figures and described herein represent illustrative embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising one or more computing devices, the system configured to:
   detect, within a digitized image object comprising a plurality of text image elements, a plurality of element groups, wherein each element group comprises one or more text image elements and is separated, within the digitized image object, from other element groups of the plurality of element groups by at least one delimiter;
   generate a first representation of the plurality of element groups, each element group being represented within the first representation as a respective two-dimensional block whose size is proportional to the combined size of the text image elements of the element group;
   generate a second representation based at least in part on the first representation, each two-dimensional block of the first representation being represented within the second representation by a respective numerical encoding, a particular numerical encoding used for a particular two-dimensional block being based at least in part on the size of the particular two-dimensional block; and
   store, as a fingerprint representing text contents of the digitized image object, at least a subset of the second representation, the subset of the second representation comprising a plurality of numerical encodings.

2. The system as recited in claim 1, wherein the one or more computing devices are further configured to:
- identify, within the first representation, the smallest two-dimensional block and the largest two-dimensional block;
- compute a difference between the sizes of the smallest and largest two-dimensional blocks;
- generate a mapping between the difference and a range of numerical values, wherein a low end of the range corresponds to the size of the smallest two-dimensional block, and a high end of the range corresponds to the size of the largest two-dimensional block; and
- determine the particular numerical encoding to be used for the particular two-dimensional block from the range of numerical values based at least in part on (a) the mapping and (b) a difference between the size of the particular two-dimensional block and the size of the smallest two-dimensional block.

3. The system as recited in claim 1, wherein the one or more computing devices are configured to:
- in response to a comparison request from a client,
  - compare the fingerprint representing text contents of the digitized image object to a second fingerprint representing text contents of a second digitized image object, and
  - provide a metric of similarity between the respective text contents of the digitized image object and the second digitized image object, based at least in part on the comparison of the fingerprint and the second fingerprint.

4. The system as recited in claim 1, wherein the digitized image object is obtained by generating an image of at least a portion of a particular document, wherein the one or more computing devices are configured to:
- in response to a search request, identify, using the fingerprint as a search parameter, a corresponding document from a collection of documents for which respective fingerprints are available, wherein the fingerprint of the corresponding document meets a similarity criterion with respect to the fingerprint of the particular document.

5. The system as recited in claim 1, wherein the one or more computing devices are configured to:
- implement one or more programmatic interfaces enabling a client to specify one or more of: (a) a range of numerical values to be used to generate the second representation, or (b) a sensitivity setting of at least one delimiter.

6. A computer-implemented method comprising:
- under control of one or more computing devices configured with specific computer-executable instructions,
  - detecting, within a digitized image object comprising a plurality of text image elements, a plurality of element groups, wherein each element group comprises one or more text image elements and is separated, within the digitized image object, from other element groups of the plurality of element groups by at least one delimiter;
  - programmatically generating a numerical representation of the plurality of element groups, comprising a respective plurality of numerical values, wherein a particular numerical value corresponding to a particular element group is selected based at least in part on a combined size of text image elements of the particular element group; and
  - storing, in an electronic memory, as a fingerprint representing text contents of the digitized image object, at least a subset of the numerical representation.

7. The computer-implemented method as recited in claim 6, wherein said programmatically generating the numerical representation comprises:
- generating a first representation of the plurality of element groups, each element group being represented within the first representation as a respective two-dimensional block whose size is proportional to the combined size of the text image elements of the element group; and
- obtaining the numerical value for the particular element group from a range of numerical values based at least in part on a mapping between a range of sizes of the two-dimensional blocks of the first representation and the range of numerical values.

8. The computer-implemented method as recited in claim 6, wherein the at least one delimiter belongs to a set of delimiters including a character delimiter, a word delimiter, a paragraph delimiter, and a page delimiter, wherein the numerical representation comprises a numerical encoding of at least one delimiter of the set of delimiters.

9. The computer-implemented method as recited in claim 6, further comprising:
- in response to a comparison request from a client,
  - comparing the fingerprint representing text contents of the digitized image object to a second fingerprint representing text contents of a second digitized image object, and
  - providing a metric of similarity between the respective text contents of the digitized image object and the second digitized image object, based at least in part on the comparison of the fingerprint and the second fingerprint.

10. The computer-implemented method as recited in claim 6, wherein the digitized image object is obtained by generating an image of at least a portion of a particular document, further comprising:
- in response to a client search request, identifying, using at least a portion of the fingerprint as a search parameter, a corresponding document from a collection of documents for which respective fingerprints are available, wherein the fingerprint of the corresponding document meets a similarity criterion with respect to the fingerprint of the particular document.

11. The computer-implemented method as recited in claim 6, further comprising:
- implementing a programmatic search interface enabling a client to indicate text for which a search is to be performed in a fingerprint collection;
- generating a particular fingerprint for a set of text elements indicated in a search request received from the client via the programmatic search interface;
- comparing the particular fingerprint with at least a subset of fingerprints of the fingerprint collection to identify one or more similar fingerprints in the collection based on a similarity criterion; and
- providing to the client an indication of one or more documents corresponding to the one or more similar fingerprints.

12. The computer-implemented method as recited in claim 6, wherein the at least one delimiter comprises a plurality of delimiters, further comprising:
- implementing one or more programmatic interfaces enabling a client to specify one or more of: (a) a range of numerical values to be used for the numerical representation, or (b) a whitespace-based property of a delimiter of the plurality of delimiters.

13. The computer-implemented method as recited in claim 6, further comprising:

implementing a programmatic interface enabling a client to request, from within an e-mail client program, a generation of a fingerprint for a document received as an e-mail attachment;

wherein the digitized image object is obtained from at least a portion of the document in response to a request received via the programmatic interface.

14. The computer-implemented method as recited in claim 6, further comprising:
obtaining one or more metrics indicative of one or more of: (a) resource usage associated with generating fingerprints for a plurality of images obtained from text-containing documents, or (b) a client satisfaction level associated with a use of fingerprints for document comparison and search; and
modifying one or more parameters associated with generating fingerprints based at least in part on the one or more metrics, wherein the one or parameters include at least one of (a) a delimiter property used in the detection of element groups, or (b) a range of numerical values used for the numerical representation.

15. The computer-implemented method as recited in claim 6, wherein the numerical value is selected from a first range of numerical values, further comprising:
generating and storing a second fingerprint representing text contents of the digitized image object, wherein the second fingerprint is generated using at least one of: (a) a second plurality of element groups identified using a different set of one or more delimiters, or (b) a second range of numerical values;
in response to a comparison request specifying the digitized image object, determining whether to use the second fingerprint for the comparison based on one of: (a) a desired comparison granularity indicator included in the request, or (b) one or more resource constraints.

16. A non-transitory computer-readable storage medium storing program instructions that when executed on one or more processors:
detect, within a digitized image object comprising a plurality of text image elements, a plurality of element groups, wherein each element group comprises one or more text image elements and is separated, within the digitized image object, from other element groups of the plurality of element groups by at least one delimiter;
generate a numerical representation of the plurality of element groups, comprising a respective plurality of numerical values, wherein a particular numerical value corresponding to a particular element group is determined based at least in part on a combined size of text image elements of the particular element group; and
store, as a fingerprint representing text contents of the digitized image object, at least a subset of the numerical representation.

17. The storage medium as recited in claim 16, wherein to generate the numerical representation, the instructions when executed on the one or more processors:
generate a first representation of the plurality of element groups, each element group being represented within the first representation as a respective two-dimensional block whose size is proportional to the combined size of the text image elements of the element group; and
obtain the numerical value for the particular element group from a range of numerical values based at least in part on a mapping between a range of sizes of the two-dimensional blocks of the first representation and the range of numerical values.

18. The storage medium as recited in claim 17, wherein the instructions when executed on the one or more processors:
generate, based at least in part on the first representation, an intermediate encoding of a size of the particular element group; and
determine the numerical value based at least in part on the intermediate encoding.

19. The storage medium as recited in claim 18, wherein the intermediate encoding comprises a color-coded representation of the particular element group.

20. The storage medium as recited in claim 17, wherein a particular two-dimensional block representing the particular element group in the first representation has a shape other than a rectangle.

21. The storage medium as recited in claim 20, wherein to obtain the numerical value, the instructions when executed on the one or more processors:
determine an angle between two sides of the particular two-dimensional block to obtain a metric of the size of the particular element group.

22. The storage medium as recited in claim 16, wherein the at least one delimiter belongs to a set of delimiters including a character delimiter, a word delimiter, a paragraph delimiter, and a page delimiter, wherein the numerical representation comprises a numerical encoding of at least one delimiter of the set of delimiters.

23. The storage medium as recited in claim 16, wherein the instructions when executed on the one or more processors:
in response to a comparison request from a client,
compare the fingerprint representing text contents of the digitized image object to a second fingerprint representing text contents of a second digitized image object, and
provide a metric of similarity between the respective text contents of the digitized image object and the second digitized image object, based at least in part on the comparison of the fingerprint and the second fingerprint.

24. The storage medium as recited in claim 16, wherein the digitized image object is obtained by generating an image of at least a portion of a particular document, wherein the instructions when executed on the one or more processors:
in response to a client search request, identify, using the fingerprint as a search parameter, a corresponding document from a collection of documents for which respective fingerprints are available, wherein the fingerprint of the corresponding document meets a similarity criterion with respect to the fingerprint of the particular document.

25. The storage medium as recited in claim 16, wherein the at least one delimiter comprises a plurality of delimiters, wherein the instructions when executed on the one or more processors:
implement one or more programmatic interfaces enabling a client to specify one or more of: (a) a range of numerical values to be used for the numerical representation, or (b) a sensitivity property of a delimiter of the plurality of delimiters.

26. The storage medium as recited in claim 16, wherein the instructions when executed on the one or more processors:
implement a programmatic interface enabling a client to request, from within an e-mail client program, a generation of a fingerprint for a document received as an e-mail attachment.

27. The storage medium as recited in claim 16, wherein the instructions when executed on the one or more processors:

obtain one or more metrics indicative of one or more of: (a) resource usage associated with generating fingerprints for a plurality of images obtained from text-containing documents, or (b) a client satisfaction level associated with a use of fingerprints for document comparison and search; and modify, based at least in part on the one or more metrics, at least one of: (a) a property of a particular delimiter used in the detection of element groups, or (b) a range of numerical values used for the numerical representation.

28. The storage medium as recited in claim 16, wherein the digitized image object is obtained by generating an image of at least a portion of a particular document comprising a plurality of document sections, wherein the instructions when executed on the one or more processors:

generate a plurality of additional fingerprints, wherein each fingerprint represents text contents of a respective document section of the plurality of document sections;

store metadata identifying the respective document section for each of the plurality of additional fingerprints; and utilize the metadata to respond to a comparison request specifying a particular document section of the particular document.

29. The storage medium as recited in claim 16, wherein the digitized image object is generated by a camera incorporated within a computing device that comprises the one or more processors.

30. The storage medium as recited in claim 16, wherein the digitized image object is obtained in response to a request to display a document on a viewing interface.

\* \* \* \* \*